(12) United States Patent
Abouchaar

(10) Patent No.: US 6,685,554 B2
(45) Date of Patent: Feb. 3, 2004

(54) AIR GUIDE BOX

(75) Inventor: Nicolas Abouchaar, Bad Rodach (DE)

(73) Assignee: Valeo Klimasysteme GmbH, Rodach (DE)

( * ) Notice: Subject to any disclaimer, the term of this patent is extended or adjusted under 35 U.S.C. 154(b) by 0 days.

(21) Appl. No.: 10/258,857

(22) PCT Filed: Oct. 19, 2001

(86) PCT No.: PCT/FR01/03265

§ 371 (c)(1), (2), (4) Date: Oct. 29, 2002

(87) PCT Pub. No.: WO02/32704

PCT Pub. Date: Apr. 25, 2002

(65) Prior Publication Data

US 2003/0068971 A1 Apr. 10, 2003

(30) Foreign Application Priority Data

Oct. 20, 2000 (DE) .......................................... 100 52 135

(51) Int. Cl.⁷ .................................................. B60S 1/54
(52) U.S. Cl. ......................... 454/121; 454/126; 454/160
(58) Field of Search ................................ 454/121, 126, 454/148, 156, 160

(56) References Cited

U.S. PATENT DOCUMENTS

| | | | |
|---|---|---|---|
| 4,157,113 A | * | 6/1979 | Karran et al. ................. 165/42 |
| 4,406,214 A | * | 9/1983 | Sakurai ...................... 454/126 |
| 5,062,352 A | * | 11/1991 | Ostrand ...................... 454/121 |
| 5,070,770 A | * | 12/1991 | Cassidy ...................... 454/160 |
| 5,399,120 A | * | 3/1995 | Burns et al. ................. 454/126 |
| 5,720,657 A | * | 2/1998 | Kamiya et al. ............... 454/121 |
| 5,967,890 A | * | 10/1999 | Loup et al. .................. 454/121 |
| 5,988,263 A | * | 11/1999 | Schwarz ...................... 165/41 |
| 6,062,298 A | * | 5/2000 | Lee ............................... 165/42 |
| 6,520,850 B1 | * | 2/2003 | Buckman et al. ........... 454/121 |

FOREIGN PATENT DOCUMENTS

| | | |
|---|---|---|
| EP | 0 423 778 A2 | 4/1991 |
| FR | 2 771 967 | 6/1999 |
| FR | 2 788 019 | 7/2000 |
| GB | 2 168 786 A | 6/1986 |

* cited by examiner

Primary Examiner—Derek Boles
(74) Attorney, Agent, or Firm—Ronald Courtney

(57) ABSTRACT

An air guide box, in particular for a heating, air conditioning and/or ventilating installation in a motor vehicle, comprising at least an air treating device (10, 12), at least an air channel (20) extending through the air treating device (10, 12), and at least an air channel (30) bypassing the air treating device (10, 12) and at least two outlet channels (40, 50), emerging in a gap (3) such that each time an outlet channel (40, 50) is substantially opposite one of the other channels (20, 30), a device (1) mobile about an axis (2) being arranged in the gap (3), which device has an air guiding element in the form of a channel (4, 5, 6, 7) and provides, in specific positions, an air passage with practically no pressure drops between two mutually opposite channels (20, 40; 30, 50), and an air passage subjected to pressure drops between other opposite channels (30, 50; 20, 40).

13 Claims, 13 Drawing Sheets

AIR GUIDE BOX

The present invention relates to an air guide box and in particular to an air guide box of a heating, air conditioning and/or ventilation system of a motor vehicle.

In general, in such an air guide box, there are provided at least one air treatment device which may for example be the evaporator of an air conditioning unit, a heating body that can be supplied with engine coolant, an electrical heating appliance or the like. To allow the air which is to be diffused into a vehicle cabin to be adjusted to suit the user, some of the air is usually guided through the air treatment device while some more may be guided past the air treatment device.

In recent years, there has been an increasing desire to be able to have several different air conditioning zones in a vehicle, for example a front air conditioning zone and a rear air conditioning zone or also a separation between the left- and right-hand halves of the vehicle, ranging as far as a combination of the abovementioned two concepts, which is four-zone air conditioning. In order to be able to make such different air conditioning zones available within a vehicle, it has been proposed that outlet paths separated from one another be provided, for example one outlet path for the front part and one outlet path for the rear part, the general trend being for the air conditioning of the front part to take priority, so that, at least in extreme situations, such as the event that there is mist on the windshield, sufficient air conditioning can be guaranteed. As a result, it has hitherto been necessary, in a mixing chamber in which the air treated by means of the air treatment device and the untreated air can be mixed, to provide an air duct which forks laterally and can guide air past the air guide box proper as far as the rear part of the vehicle. This added part does not, on the one hand, allow any independent adjustment of the front part and of the rear part and, on the other hand, requires additional build volume, which is not available most of the time in motor vehicles. The problem of the limited build volume is all the more serious if, as the Applicant company has tried to do, a hot air duct and a cold air duct are provided individually for the rear part, which ducts have both to be guided past the air guide box section for the front part.

Considering these facts, there is a need for an improved air guide box which, for a small required build volume, makes it possible, on the one hand, to, as desired and satisfactorily, supply all the air conditioning zones or just some air conditioning zones satisfactorily with treated air and/or untreated air.

According to the invention, this objective is achieved using an air guide box which has the characteristics of claim 1. Preferred improvements are defined in the dependent claims.

In particular, the invention proposes an air guide box, particularly for a heating, air conditioning and/or ventilation system of a motor vehicle, in which there are provided at least one air treatment device, at least one air path extending across the air treatment device, and at least one air path bypassing the air treatment device and at least two outlet paths. The invention in this context makes provision for the various paths to open into a space in such a way that each time an outlet path finds itself essentially facing one of the other paths, a device that can move about an axis being arranged in this space, which device has an air guiding element in the form of a duct and, in defined positions, provides an air passage with practically no pressure drops between two paths facing each other and an air passage subject to pressure drops between other paths facing each other.

In other words, the invention makes it possible to use one and the same space to guide the air in two different directions, by causing the device to pivot about an axis which, for example, is centered, or may be offset. In one of the defined positions, a configuration of one duct in another is thus provided so that these ducts run essentially in parallel and thus allow a maximum air throughput, for example in the deicing mode, whereas in another defined position, a passage one inside the other of two air streams which are disconnected form one another is possible, it being possible for the two directions of flow to be, for example, at right angles to one another. In the second scenario mentioned, a passage practically free of pressure drops is thus possible in the inner duct, which is defined by the air guiding element in the form of a duct, from, for example, the air treatment device as far, for example, the rear part of the vehicle, while the supply of fresh air to the front part is subject to a certain pressure drop, caused by the presence of the air guiding device in the form of a duct transversely to the direction of flow toward the front outlets of the flow.

Because of the possibility of defining two flow paths one inside the other, at least partially uncoupled from one another, it is possible to obtain particularly short routes for the air to take, so that the heat and/or pressure drops can be minimized even further.

Advantageously, there is isolating engagement in at least one position between the air guiding element in the form of a duct and at least one path, particularly with respect to two paths facing one another. Thus, for example, a continuous air path may be formed between the air treatment device and the rear part, so that a defined quantity of treated air can be diffused into the rear part independently of the technical air conditioning settings of the front part.

In the configuration in which the two air paths cross, to make it possible to use the air originating both from the air path running across the air treatment device and the air path bypassing the air treatment device, the air guiding element in the form of a duct is advantageously provided with an opening which allows the air to fork out of the passage subject to a pressure drop.

The element for guiding the air in the form of a duct may preferably have at least two compartments, at least one of which may be closed, except for the ends. For example, it would thus be possible, in the case where the air treatment device was a heating body, to produce a hot air path defined as far as the rear region, which is flanked by another path which can be supplied with air which is cooler beside the heated air, which is thus branched from the passage subject to a pressure drop.

Advantageously, the cross section of the air guiding element in the form of a duct is practically constant, but nonetheless has at least no significant narrowing which could lead to a pressure drop.

From the point of view of the art of fluid mechanics, it may be advantageous for the air guiding element in the form of a duct to be produced with a curvature, so that it can, for example, in a defined position, allow air to be deflected upward, and in another defined position, allow air to be deflected downward.

In the preferred form of the embodiment, the device which can move about an axis comprises means for blocking at least one path, particularly two paths facing one another in at least one of the defined positions. In this way, it is, for example, possible to prevent air from reaching the rear part, something which is desirable in particular in situations in which the maximum amount of air is required in the front part.

Advantageously, the aforementioned means may be produced as one piece with the air guiding element in the form of a duct and form therewith for example an essentially cylindrical body. If an at least partial double wall is thus provided, the quality of the flow through the device can be improved for arbitrary defined positions and intermediate positions.

The width of the air guiding element in the form of a duct or also of the device which can move about the axis has advantageously to be essentially equal, in the direction of the axis, to the width of at least one path, particularly of a pair of paths facing one another.

Finally, it is preferable for the width of the air guiding element in the form of a duct or of the device which can rotate about the axis in the direction of the axis, to correspond essentially to between 15% and 85%, particularly between 20% and 40%, of the width of a path, particularly of a pair of paths facing each other, the range from 20% to 40% being particularly appropriate for the case where one of the air outlet paths involved is designed for the space at the back or the space for the feet in a vehicle. In other applications, for example when the device which can move is arranged in any arbitrary mixing chamber of the installation, such as the one feeding the dashboard diffusers and the windshield diffusers, another range from 50% to 70% may be anticipated. In this context, it should also be pointed out that the direction in which the device can be moved can range to both essentially horizontally, vertically or also at an angle. Furthermore, the term "width" must also be understood as meaning a sum of widths, for example when two ducts are arranged spaced apart. In the case of two spaced-apart ducts, these could range from closely side by side out to the widest path edges, it being possible for a wall of the duct or ducts also to be formed by the box itself.

Keeping with the given ratios, it is possible to guarantee that enough air can pass past the air guiding element in the form of a duct in at least one defined position to supply the air conditioning zone which is not supplied with air without pressure drop which crosses this air flow for example at right angles by interposing the air guiding element in the form of a duct.

To sum up, it is possible to establish that the invention makes it possible, at choice, for minimal space requirements, for two air flows to be able to enter one inside the other whereas, in another scenario, in another defined position, practically the entire flow cross section is available as if, for example, an air duct for the rear part of the vehicle was no longer even present.

It should be mentioned that the teaching according to the invention can also apply to several air paths which cross at one or more points, it being possible for the person skilled in the art also to recognize that, from the point of view of the art of fluid mechanics, downstream in the direction of the flow, of the device which can rotate about the axis, other hot and/or cold air supplies are possible, for example also by means of a conventional butterfly valve.

Other advantages and characteristics of the invention result from the following description, given merely by way of example, of a few preferred forms of embodiment, and which makes reference to the appended drawings, in which.

Figure 12:
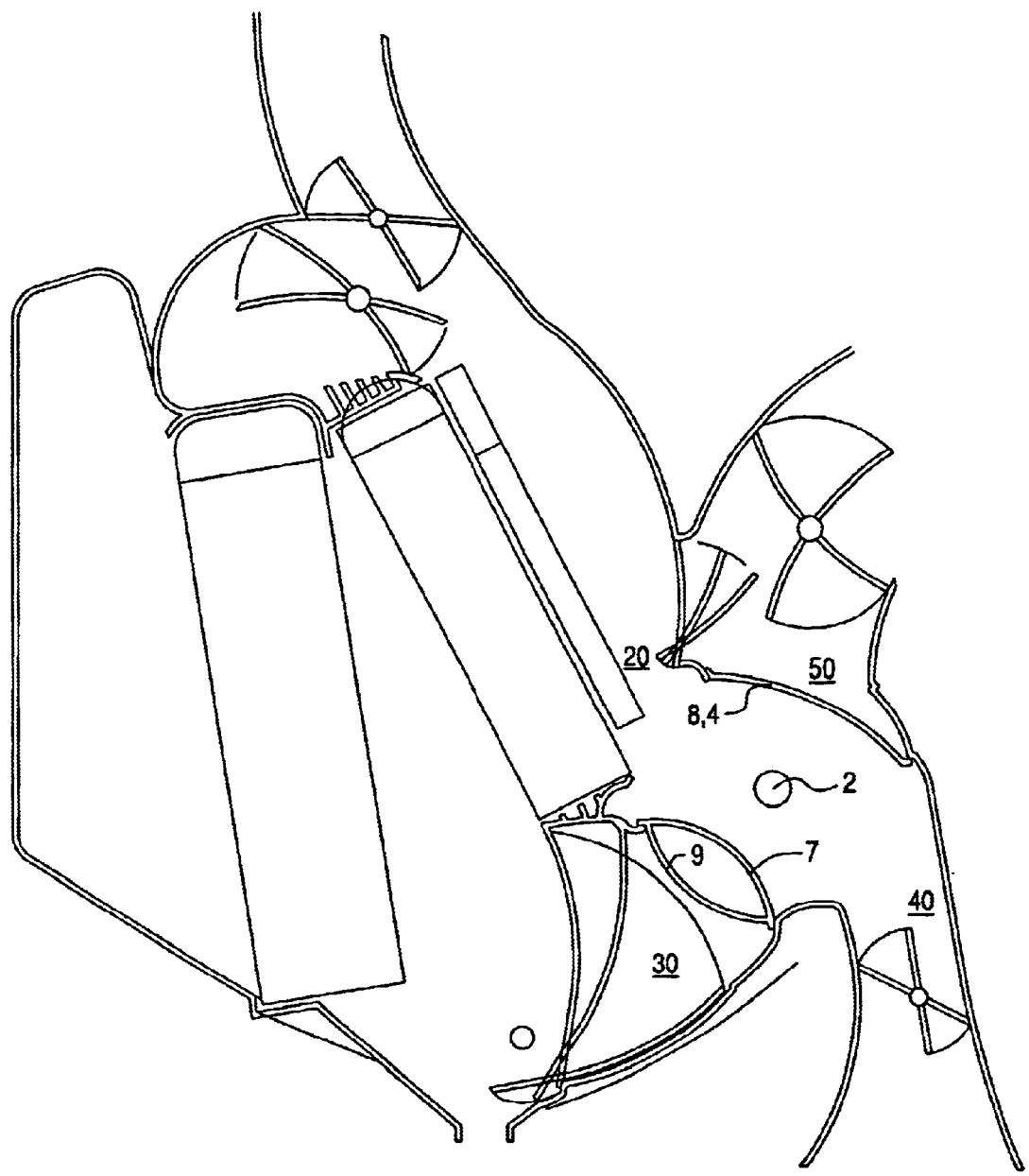
Figure 13:
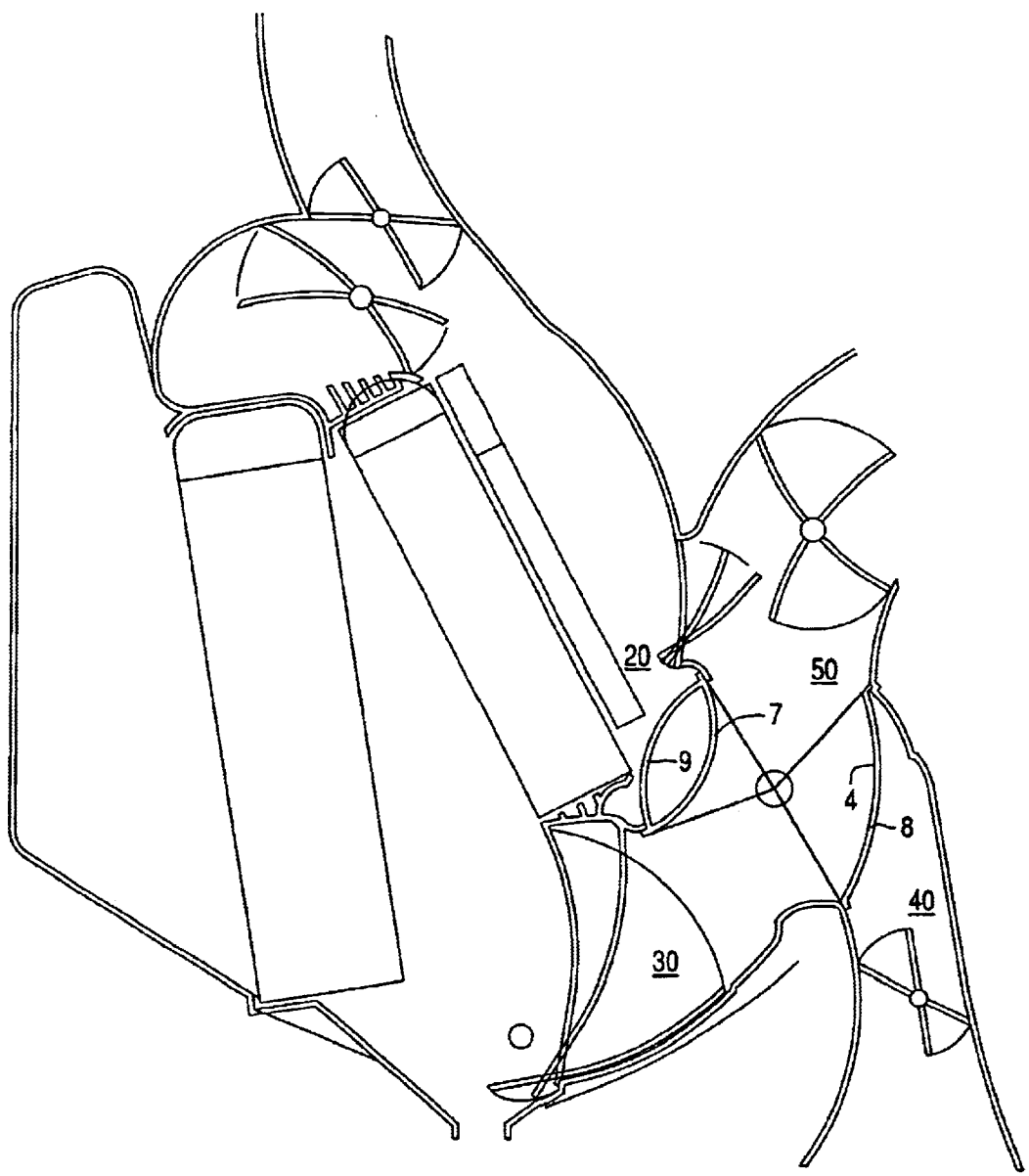

FIGS. 12 and 13 finally illustrate yet another preferred form of embodiment in two different defined positions, of the device that can move about the axis, which contains, by way of essentially cylindrical body formed in one piece, the air guiding element in the form of a duct and the means for blocking at least one air path.

Figure 1:
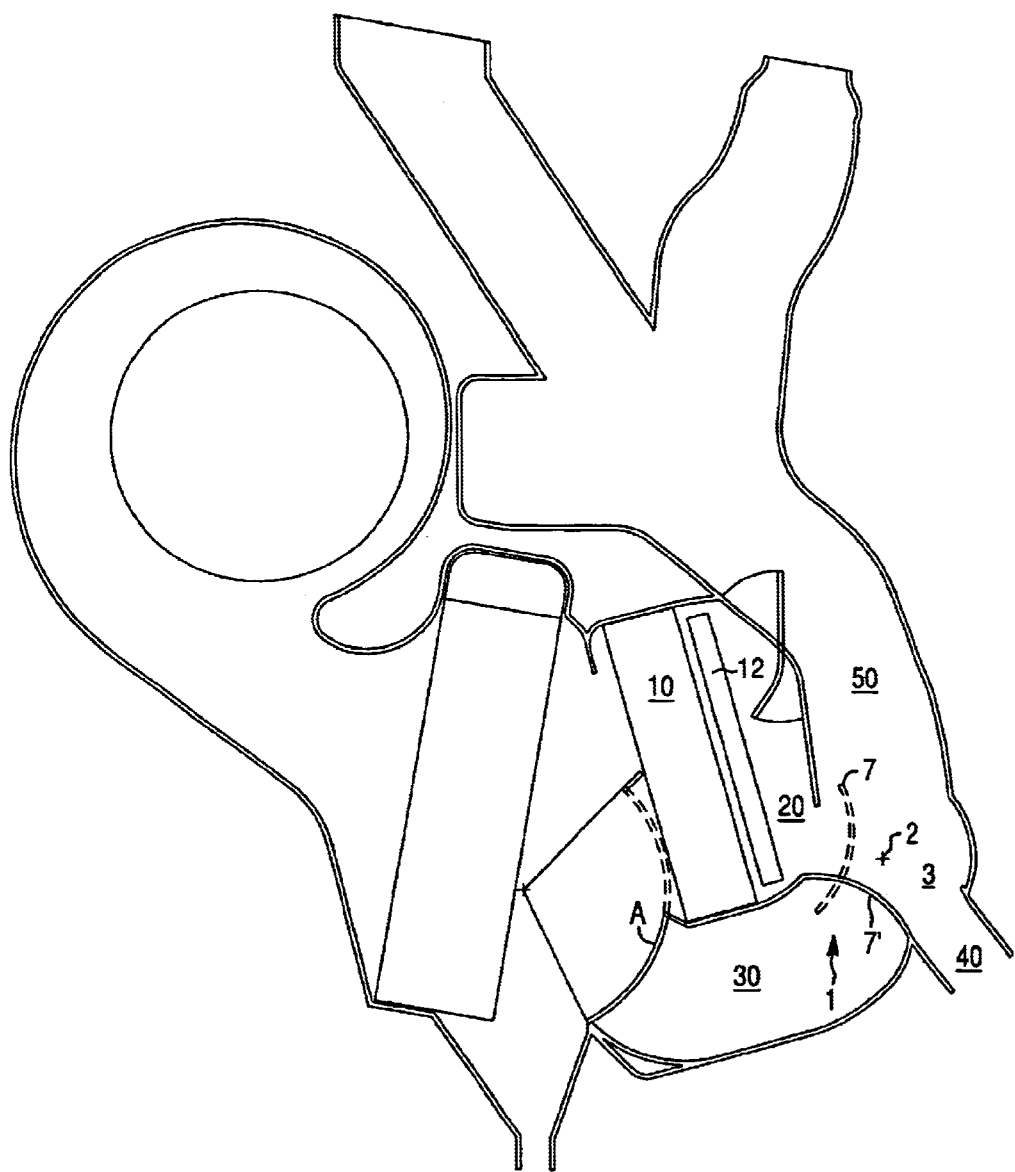
FIG. 1 illustrates a view in section through an air guide box according to a preferred first form of embodiment.

FIG. 1 illustrates in a part section, an air guide box by way of a preferred form of embodiment of the invention, which forms part of a ventilating-heating device for a motor vehicle. Provided in the air guide box, by way of air treatment device, are a heat exchanger for heating 10 which can be supplied with engine coolant and an electric hearing device 12 mounted downstream. The air supplied by a blower, not illustrated, may, possibly having passed across an evaporator—insofar as an air conditioning installation is also provided—pass at choice and in a regulated fashion, through a control valve A and across the air treatment device and take an air path 20 running across the air treatment device, or be guided past the air treatment device, and thus take an air path 30 which bypasses the air treatment device, respective proportional regulation also being possible by way of the air control valve A. At the respective ends lying downstream of the flow from the point of view of the art of fluid mechanics, the paths 20 and 30 open into a space 3. From the space 3, an air path 30 runs upward toward the diffusers of the front part of a motor vehicle, and another air outlet duct 40 runs downward and backward toward the air diffusers in the rear part. In the space 3, in which in theory the air flows leaving the paths 20 and 30 can mix and can be diffused toward the paths 40 or 50, there is a device 1 which is mounted so that it can move, in this instance so that it can rotate, about an axis 2.

The device 1 comprises an air guiding element in the form of a duct which comprises a duct wall 7 and two side walls, not illustrated in this view. As illustrated, the device 1 may be arranged in two defined positions which are indicated by the duct wall 7 for one position and by the duct wall 7' for the other position. Obviously, the device 1 could also form two lateral ducts or several distributed ducts.

According to one first mode of operation, as much air as possible needs to be able to pass, without pressure drop, from the path 30 to the path 50, and this is why the air guiding element in the form of a duct and in particular, in the illustration, the duct wall 7, runs essentially parallel to the direction of the flow. Because of the curvature of the duct wall 7, the existing flow profile is taken into consideration which means that, with the exception of the thickness of the material of the air guiding element in the form of a duct, there is no resistance to the flow and therefore no pressure drop. In the position indicated by the reference number 7, a passage from the path 20 to the path 40 is, however, blocked or subject to pressure drops.

In another defined position of the air guiding element produced in the form of a duct, the wall of the duct lies in the position indicated by the reference number 7', which means that passage from the duct 20 to the duct 40 can occur with practically no pressure drop. In this arrangement, in spite of a pressure drop that there is on account of the present of the duct formed, enough air can flow from the duct 30 to the duct 50, because, in the direction of the axis 2, the width of the air guiding element in the form of a duct is less than the width of the path 30 and of the path 50, as is more clearly apparent from FIG. 2, which reproduces a cross section at right angles to the plane of the drawing of FIG. 1 through the air guiding element in the form of a duct.

It should be recognized that the air guiding element in the form of a duct, mounted on the axis 2, is open in one direction, namely upward, and comprises, apart from the duct wall 7, side walls 5 and 6 where, for the form of embodiment illustrated, enough space is available laterally and to the side of the walls 5 and 6 for air to be able to pass from the path 30 to the path 50 so as to be able to air condition the front part independently of the mode of operation. In an alternative form of embodiment which has not been illustrated, a duct open downward could also be provided correspondingly. It should be pointed out, as far as the axis 2 illustrated is concerned, that although it is illustrated in a central position, it could just as easily lie in an offset position, or also in some other orientation, for example vertical instead of horizontal. In the form of embodiment illustrated, the width of the air guiding element in the form of a duct corresponds approximately to 30% of the width of the paths 30 or 50, whereas it corresponds essentially to that of the paths 20 and 40. According to a different embodiment, the form of embodiment illustrated in FIGS. 1 and 2 allows a parallel arrangement for example of a duct in another coaxial one between the paths 30 and 50 on the one hand, the air guiding element in the form of a duct on the other hand lying in another defined position 7' transversely to the passage between the path 30 and the path 50, and forming a passage free of pressure drops from the path 20 to the path 40.

Figure 3:
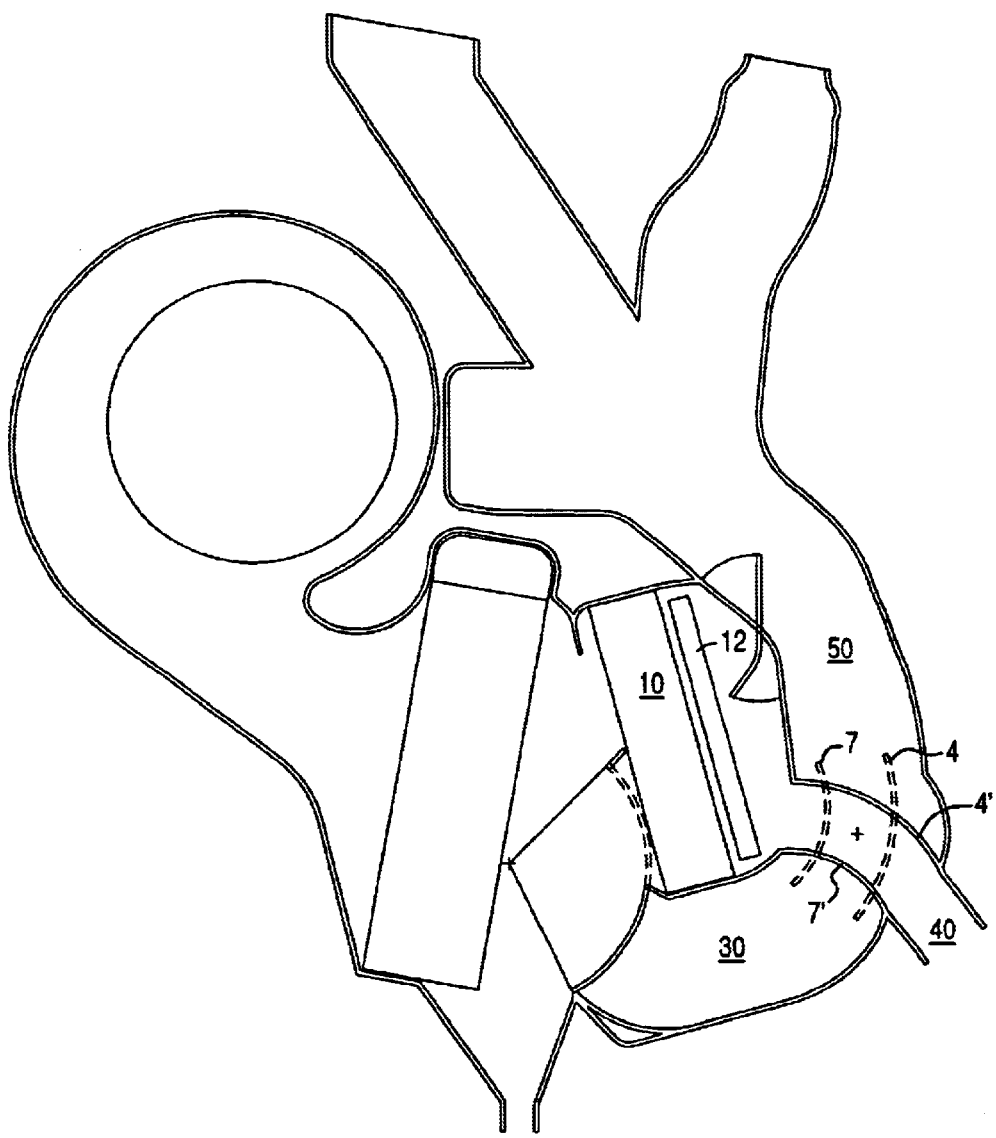
FIGS. 3 and 4 illustrate alternative forms of embodiment from the one illustrated in FIG. 1, the air guiding element in the form of a duct forming a duct which is closed except at the ends.
Figure 4:
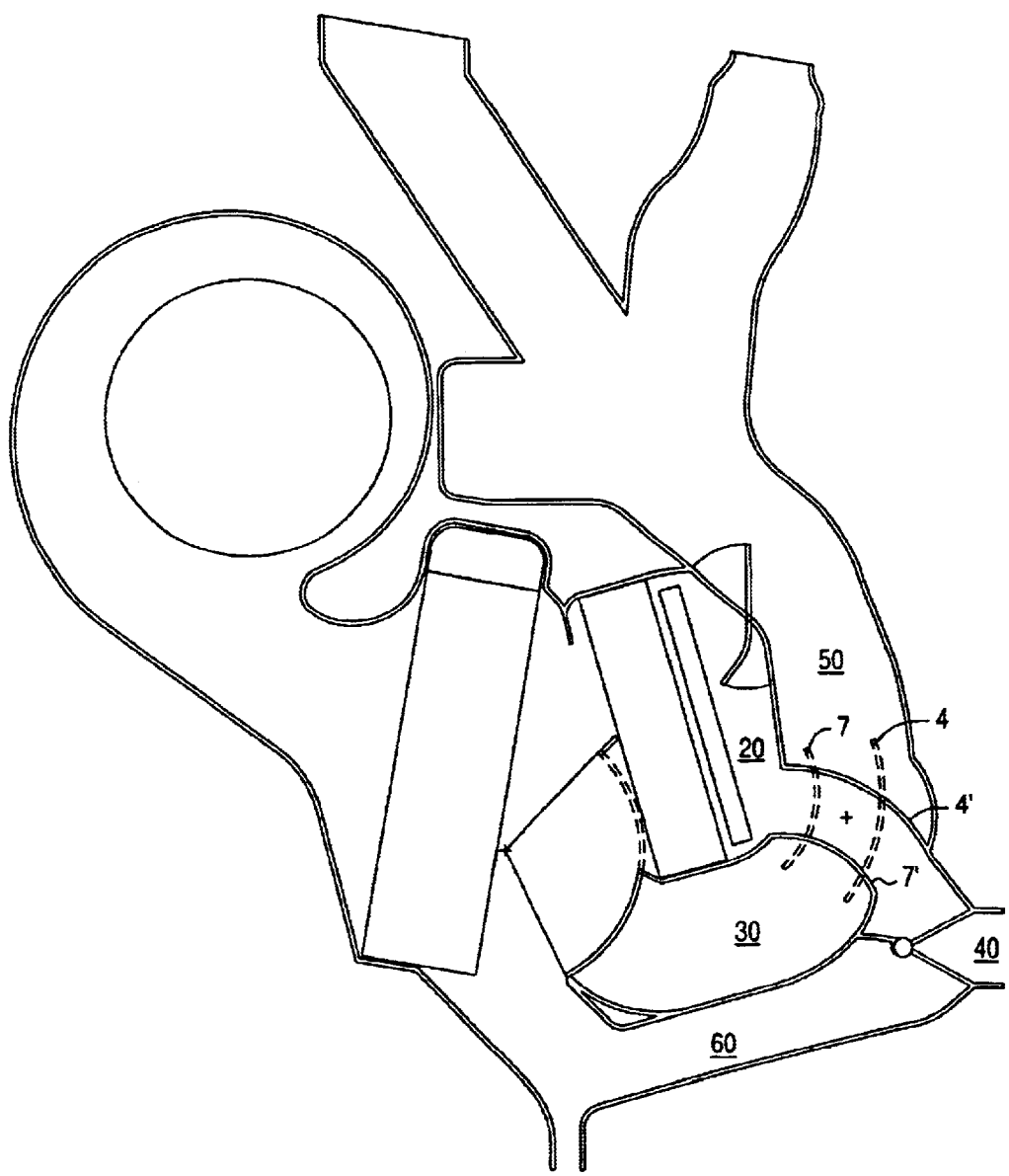

FIGS. 3 and 4 illustrate respective improvements in a view similar to FIG. 1, the corresponding elements being provided with corresponding reference numerals. In the forms of embodiment illustrated in FIGS. 3 and 4, the air guiding element in the form of a duct comprises, in addition to the duct wall 7 and the side walls 5 and 6, another duct wall 4, which means that a duct which is closed except at its ends, is defined, which duct can engage hermetically in one position with the path 20 and/or the path 40, so as to form a continuous flow route from the air treatment device 10, 12 toward the space for the feet in the rear part, it also being possible for the front part to be air conditioned because the air from the path 30 can flow forward at the duct formed toward the path 50. If, instead of air conditioning or heating the rear part, it is desirable or necessary to have a maximum passage of air into the front part, the device 1 can easily be pivoted so that the walls 4, 5, 6, 7 of the duct lie essentially parallel to the direction of flow between the paths 30 and 50, so that a cross section with practically no narrowing is established between the path 30 and the path 50.

The form of embodiment illustrated in FIG. 4 differs from that of FIG. 3 in a decisive way in that the air outlet duct 40 can also be supplied via a fresh air duct 60. If then a transition practically free of pressure drop occurs from the air path 20 to the air path 40 for air treated with heat, temperature regulation can be obtained by mixing therewith fresh air using the duct 60. Although that has not been illustrated, it is possible, in the form of embodiment illustrated in FIG. 4, as in other forms of embodiment of the invention, to provide nonreturn valves, particularly to prevent, for example, fresh air from reaching the hot air flow path 20 from the air path 30 and/or 60.

Figure 5:
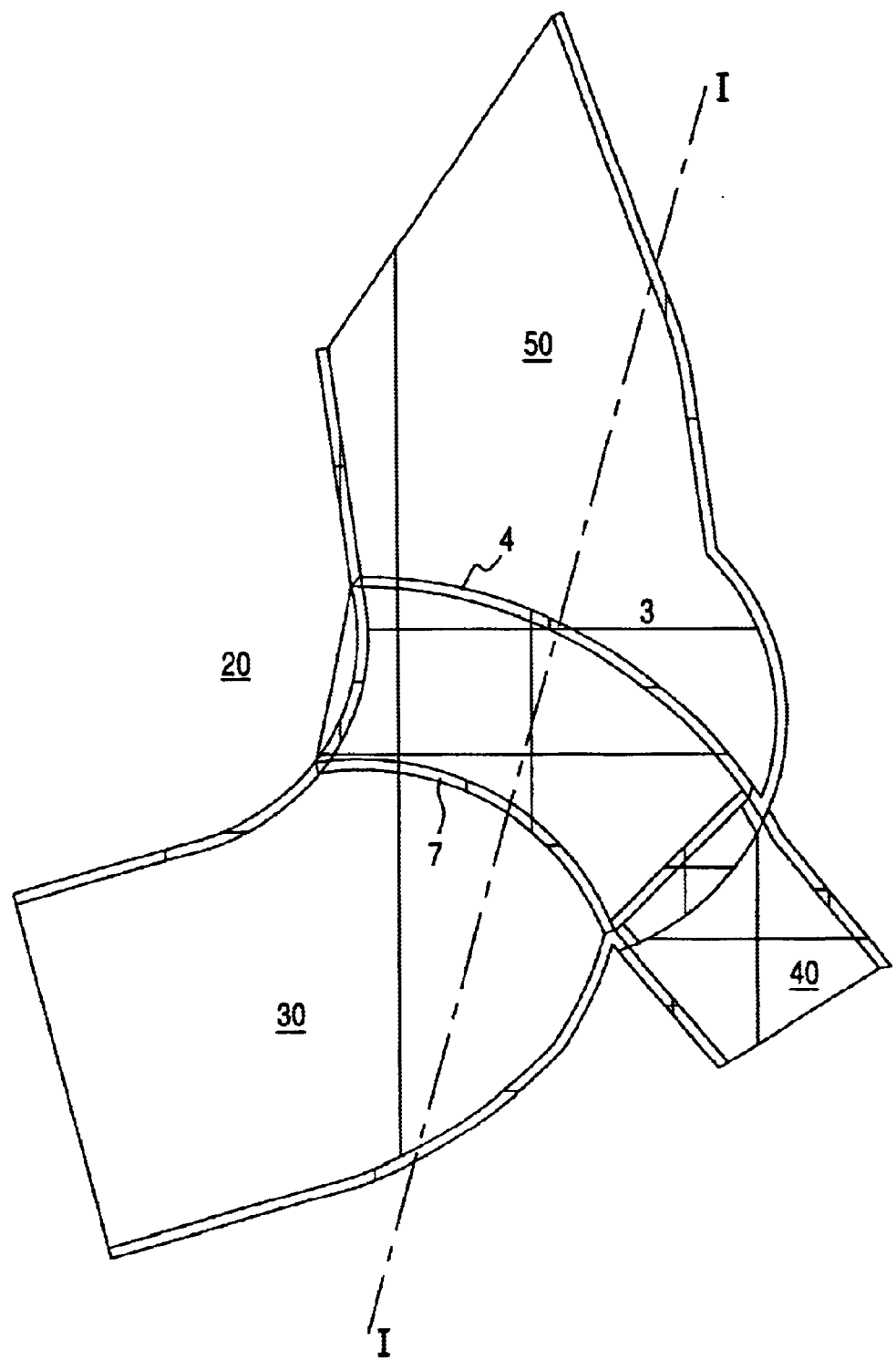
FIG. 5 illustrates a detailed sectional view of the forms of embodiment illustrated in FIGS. 3 and 4, particularly of a space 3 and into which the various air paths open.

FIG. 5 illustrates a detail view relative to the space 3, into which there opens the hot air supply path 20, the fresh air supply path 30 and the air discharge paths 40 and 50, for each different air conditioning zone, this detail view corresponding to the depiction of FIGS. 3 and 4.

Figure 6:
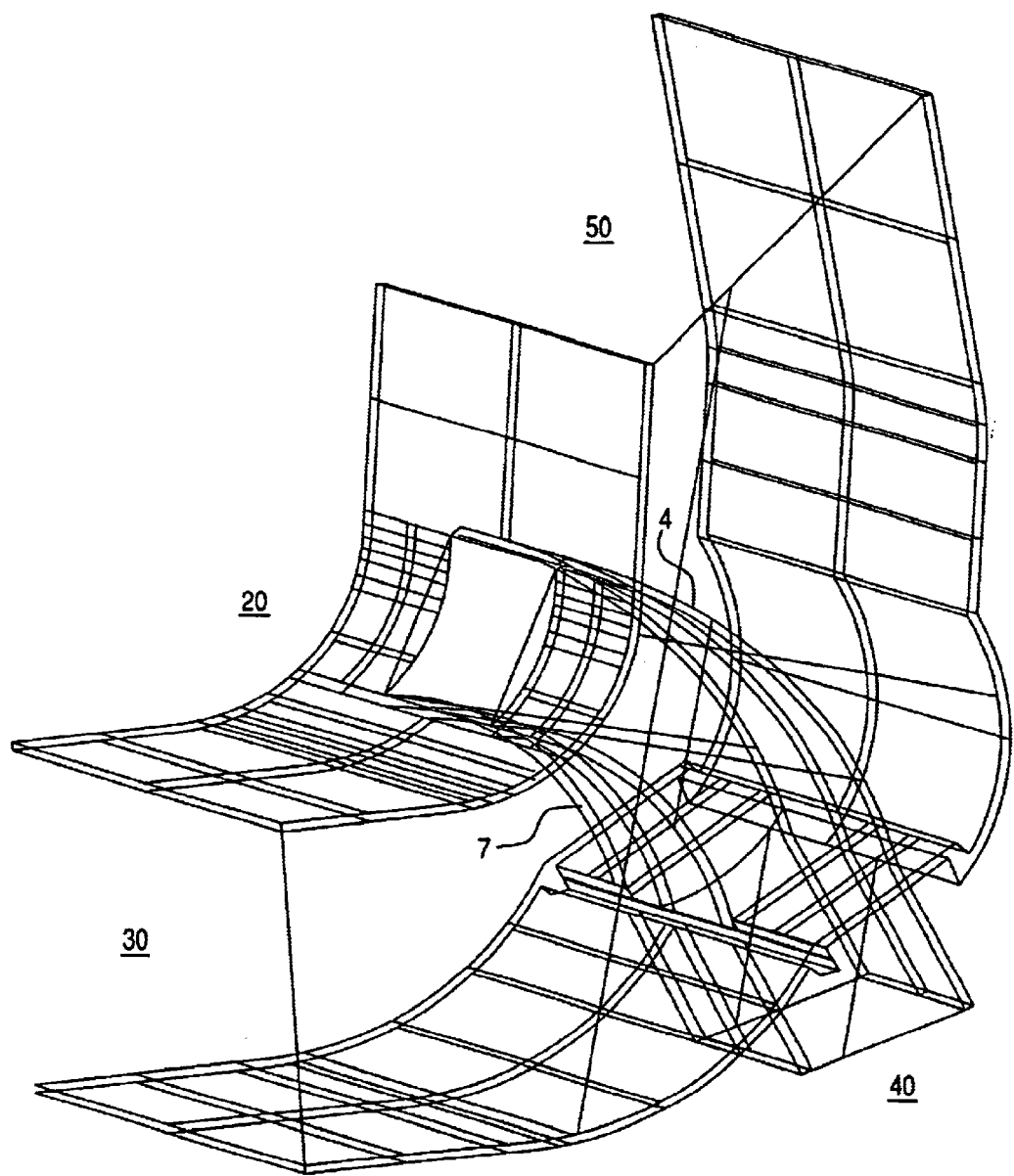
FIGS. 6 and 7 illustrate perspective depictions of the detailed view illustrated in FIG. 5.
Figure 7:
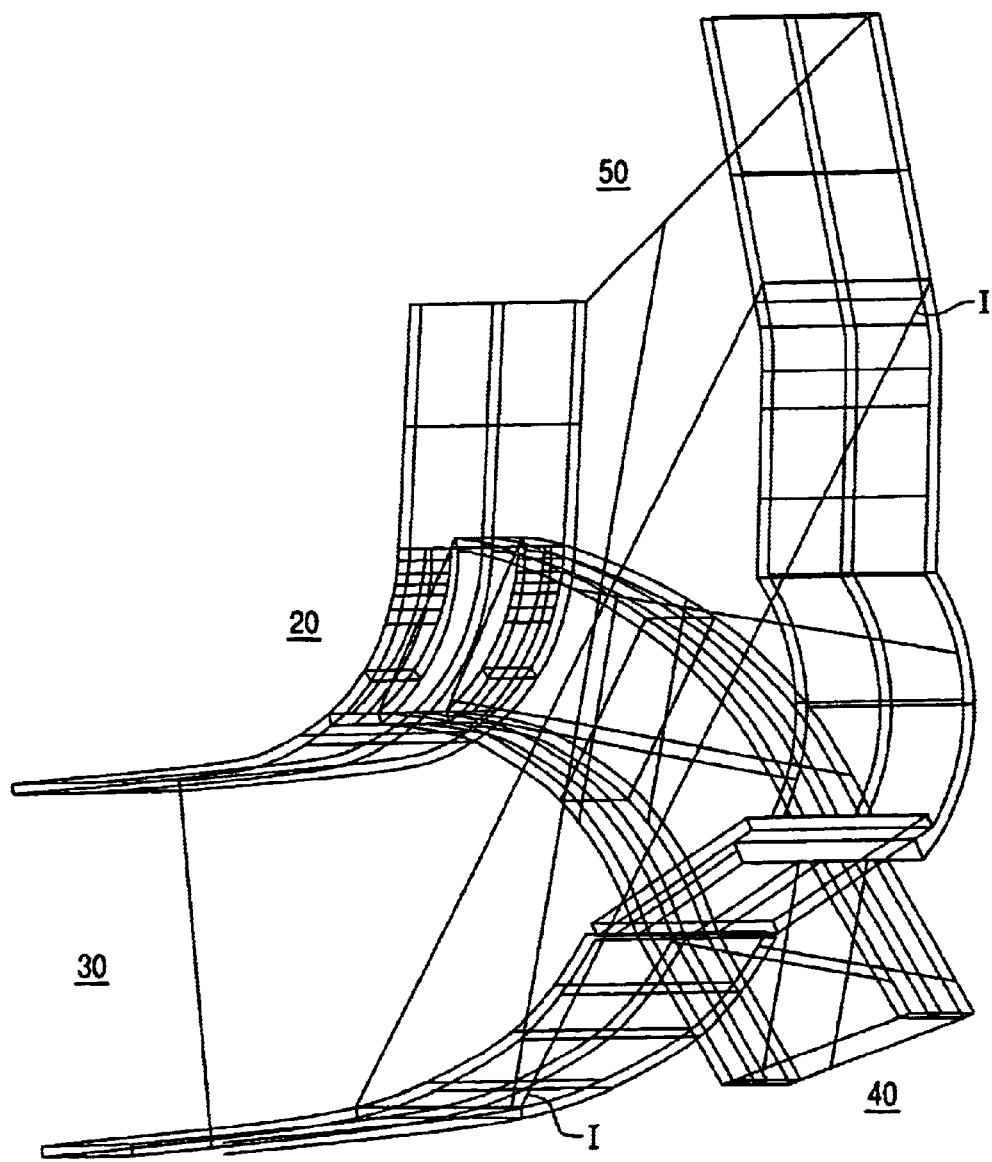

In order to demonstrate the air passages defined penetrating in one another between the different air paths, the detail section illustrated in FIG. 5 is illustrated in perspective in FIGS. 6 and 7, a passage practically free of pressure drops from the path 20 to the path 40 and a passage subject to a pressure drop from the path 30 to the path 50 being illustrated by way of defined position. As can be appreciated from the perspective views, the pressure drop during the passage from the path 30 to the path 50 results essentially from the presence of the duct walls 7 and 4. It can also be appreciated from the illustration that the configuration chosen for the duct is chosen deliberately to have an essentially rectangular section, which means that other surfaces in cross section can easily be represented with slight modifications, for example round, elliptical or polygonal sections, it being possible for the effect of the duct wall 7 by way of an incident surface and therefore by way of a cause for the reduction in pressure, to be reduced still further.

Figure 2:
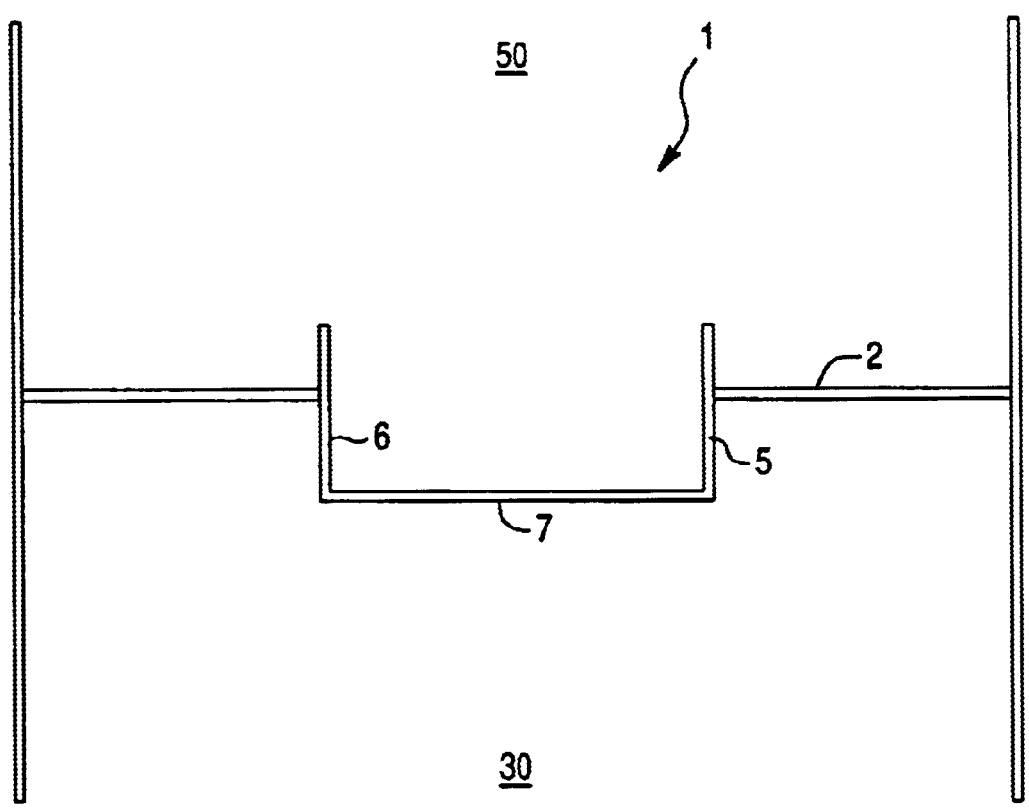
FIG. 2 illustrates a section through the air guiding element in the form of a duct, illustrated in FIG. 1.
Figure 8:
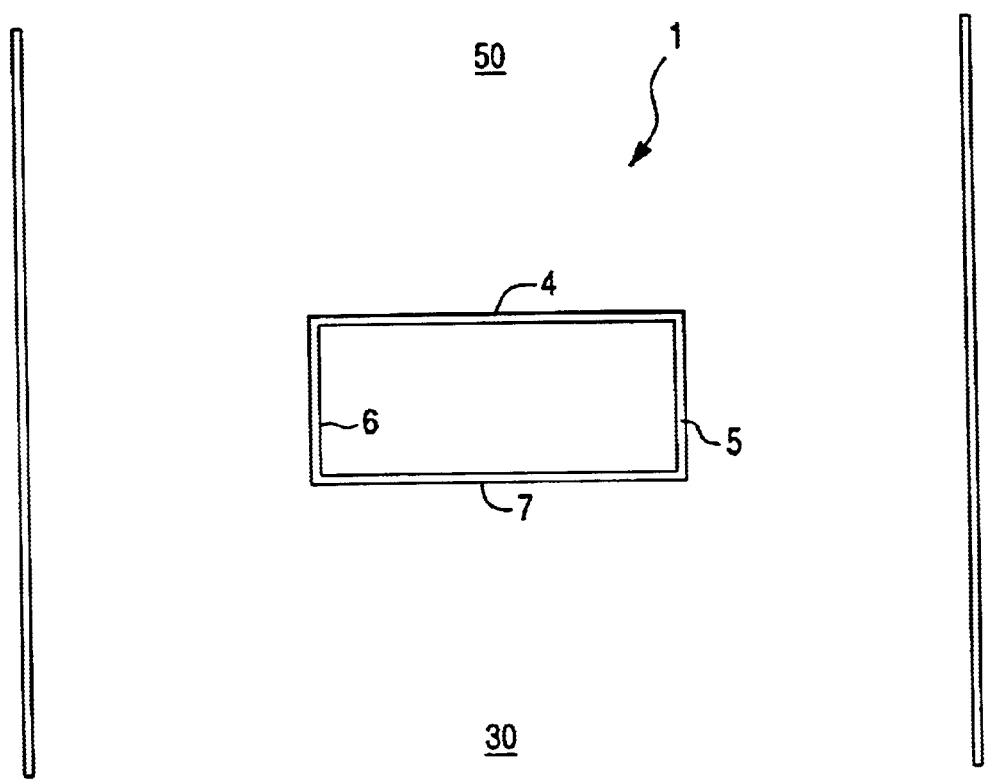
FIG. 8 illustrates a view in section through the air guiding element in the form of a duct contained in FIG. 3 or FIG. 4, and this section is on a plane I—I, as indicated in FIG. 5 and FIG. 7.

FIG. 8 illustrates, as in FIG. 2, a part section through the forms of embodiment illustrated in FIGS. 3 and 4, this section being on a plane of section I—I, as indicated in the detail views of FIGS. 5 and 7.

Figure 9:
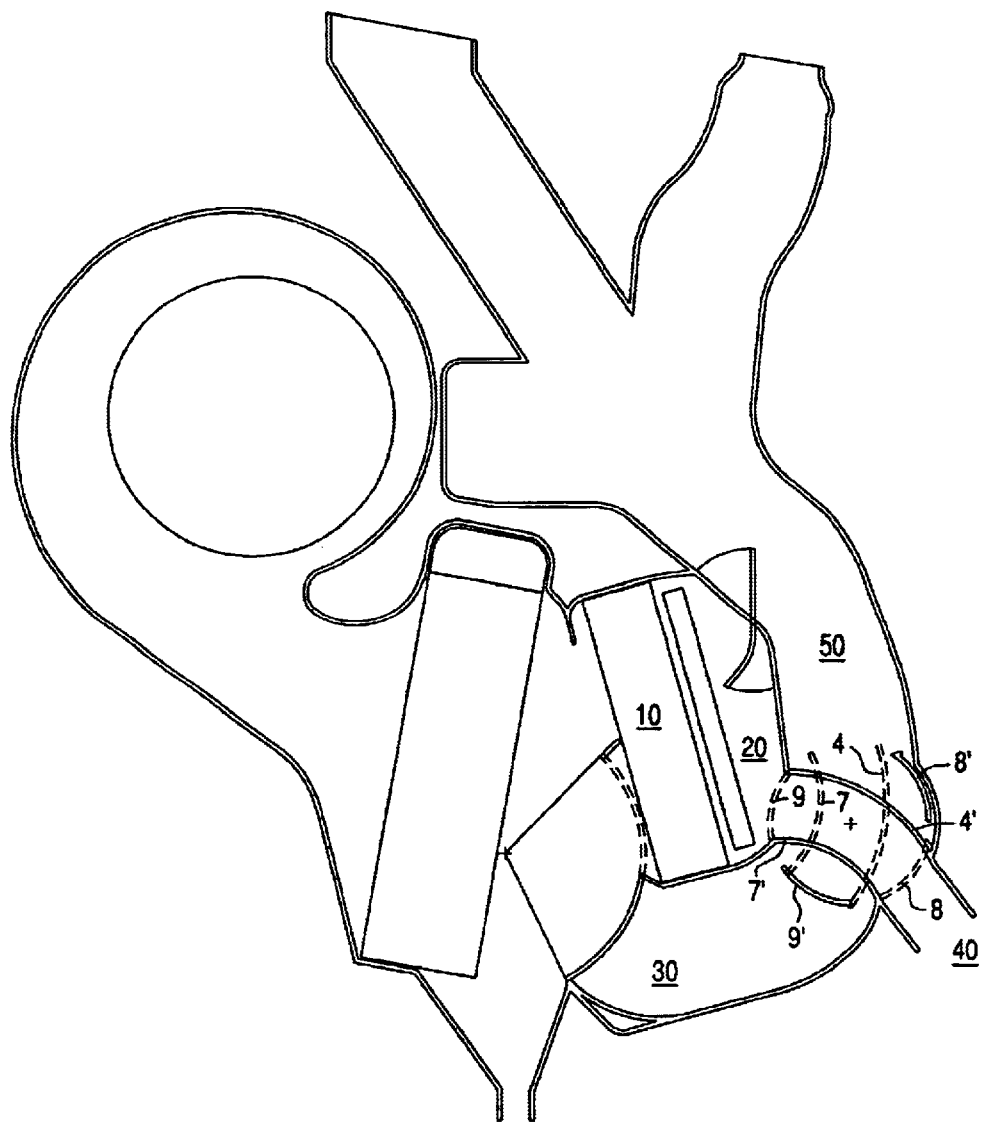
FIG. 9 illustrates an improvement to the form of embodiment illustrated in FIG. 3 with means which allow two air paths to be blocked.

FIG. 9 illustrates yet another preferred form of embodiment which is similar to the forms described hereinabove. In this form of embodiment, additional means 8, 9 are, however, provided, and can block off and uncover the ducts 40 or 20. The movement of these means with the air guiding element in the form of a duct 4, 5, 6, 7 can be controlled jointly or independently. As in the previous forms of embodiment, the respective defined positions are, on the one hand, indicated by reference numerals without a prime symbol and, on the other hand, by reference numerals with a prime symbol. By virtue of the shut-off means 8, 9, leaks toward the rear part can be avoided when a maximum discharge of air in the front part is desired or needed. The shut-off means 8 and 9 could also be configured in such a way that they can be controlled separately, and can prevent leaks of hot air. Furthermore, although this is not illustrated, it is possible to provide a return means, for example in the duct, so as to prevent cold air from flowing from the rear forward, or from the bottom upward, via the path 20.

Figure 10:
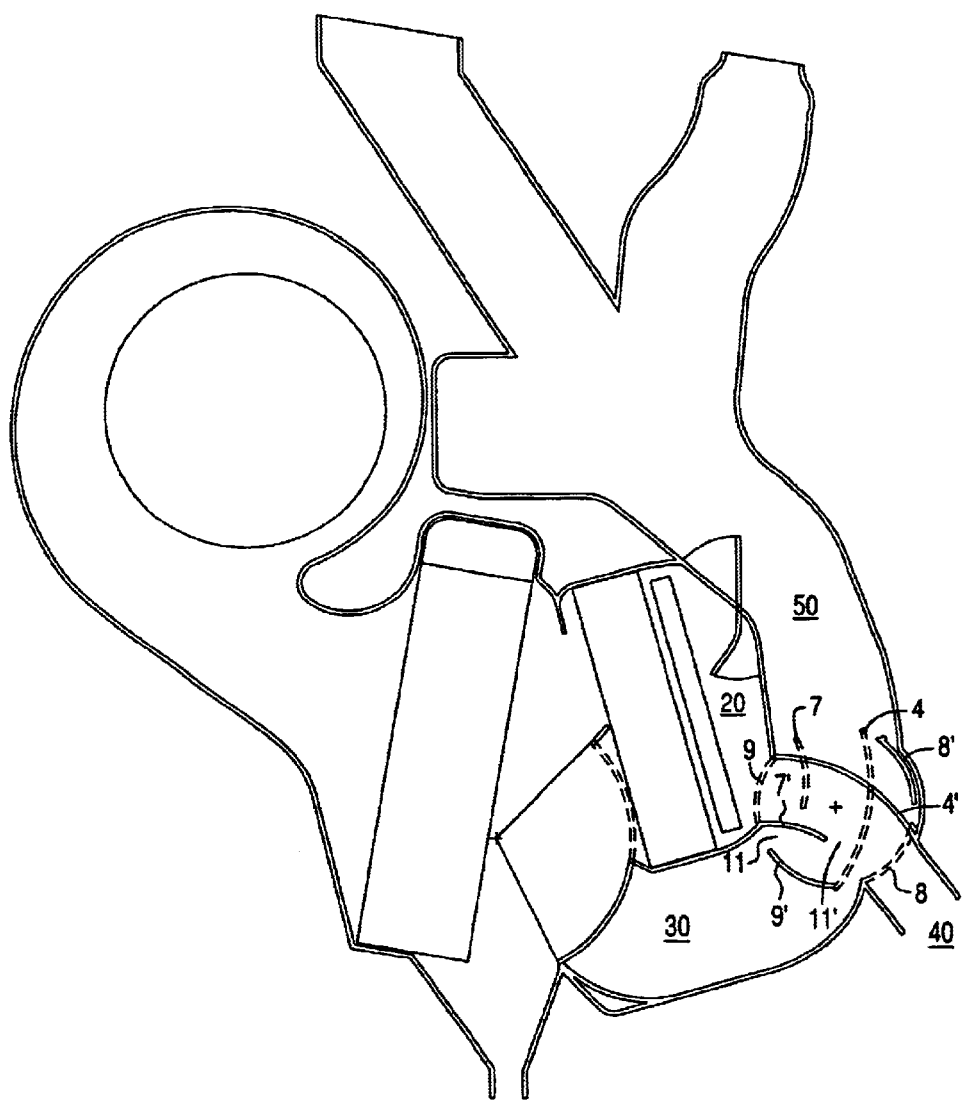
FIG. 10 illustrates yet another improvement to the form of the embodiment illustrated in FIG. 5, in which it is possible to have a fork from the passage subject to pressure drops.

FIG. 10 illustrates another preferred form of embodiment of the air guide box according to the invention, the wall 7 mounted upstream from the point of view of the art of fluid mechanics of the air guiding element in the form of a duct being provided with an opening 11, which allows part of the flow from the duct 30 to the duct 40 to be bypassed or deflected so as, in the case of the embodiment described, to make a slightly lower temperature available in the back region. In other respects, the operation of the form of embodiment illustrated corresponds to that of FIG. 5.

Figure 11:
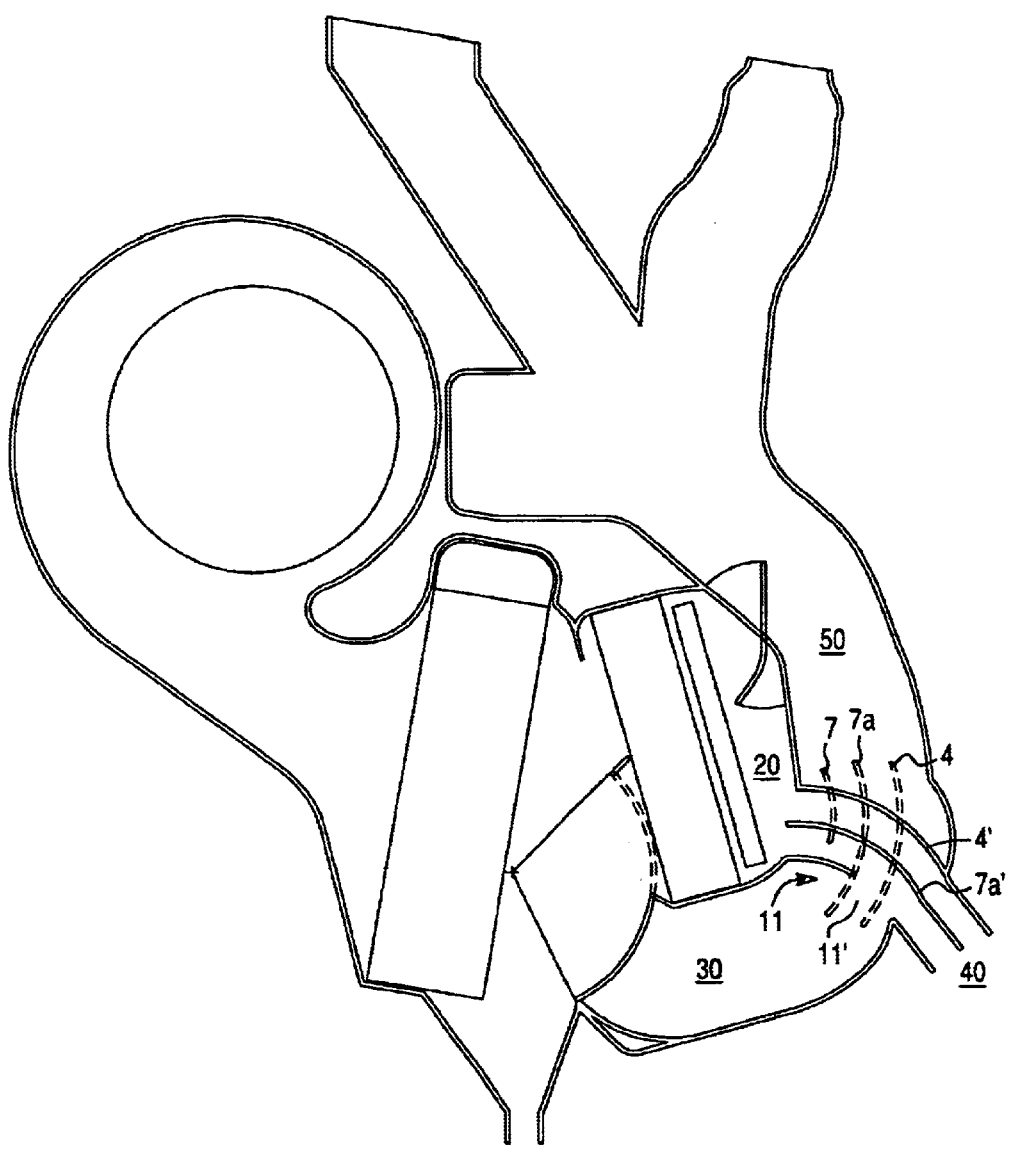
FIG. 11 illustrates another preferred form of embodiment which combines the concepts of FIGS. 5 and 6, but no means of blocking the paths being provided.

The form of embodiment illustrated in FIG. 11 is essentially a combination of the forms of embodiment illustrated in FIGS. 9 and 10, although the means of blocking the air paths have been omitted, but could just as easily be added. In the form of embodiment illustrated here, the air guiding element in the form of a duct forms two ducts isolated from one another, one duct of which is closed except at its ends, while the other duct has an opening 11 which allows fresh air to be supplied as far as the rear region. As in the forms of embodiment described earlier, the device 1 could also be positioned in such a way that there is a practically unobstructed air passage from the path 30 to the path 50. It should be pointed out that, in the position in which the air is guided from the air treatment device 10, 12 toward the path 40 for the rear region, the separation between the closed duct and the half-open duct can be continued into the region of the path 40, so that in-situ mixing and regulation can be performed using known means.

FIGS. 12 and 13 illustrate another form of embodiment of the air guide box according to the invention, in which the means 8, 9 for blocking the path 20 and/or the path 40 are produced as one piece with the air guiding element in the form of a duct and define an essentially cylindrical body by way of device 1. The operation corresponds essentially to that of the previous forms of embodiment. In particular, the position illustrated in FIG. 12 allows air to be guided in a duct from the air treatment device as far as the rear region, it being possible for air to pass from the path 30 to the path 50 past the device 1, and this being true only on one side or, as in the forms of embodiment described earlier, on both sides thereof.

In the other defined position, illustrated in FIG. 3, the paths 20, 30 are blocked by the means 8, 9, the total cross section being essentially uncovered for the air conditioning of the front part, namely both through the duct and also laterally past it, that is to say parallel to the plane of the drawing past the device 1.

Although the present invention has been described previously entirely with reference to some specific forms of embodiment, the person skilled in the art will appreciate that various variations and modifications are possible within the context of the claims. In particular, the person skilled in the art will recognize that particular characteristics of one form of embodiment can be combined at choice with other characteristics of other forms of embodiment. In particular, the air guiding element could just as easily constitute one or two lateral ducts, in which case a wall could be produced by sealed application against the box itself.

What is claimed is:

1. An air guide box, particularly for a heating, air-conditioning and/or ventilation system of a motor vehicle, comprising:

1. at least one air treatment device;
   2. at least one air path extending across the air treatment device;
   3. at least one air path bypassing the air treatment device;
   4. at least two outlet paths which open into a space;
   5. at least one air guiding element located in said space;

wherein when at least one of said outlet paths is substantially facing at least one of said air paths, said air guiding element allows, in defined positions, a first air passage with little to no loss of pressure between said face to face outlet path and said air path, and a second air passage with pressure drop between said facing outlet path and said air path.

2. An air guide box as in claim 1 wherein said air guiding element is in the form of a duct.

3. The air guide box as in claim 1 wherein said air paths and said outlet paths pass through air ducts.

4. The air guide box as in claim 2, wherein the air guiding element can engage hermetically in one position with at least one adjacent air duct.

5. the air guide box as in claim 4, wherein two air ducts face each other.

6. The air guide box as claimed in claim 2, wherein the air guiding element in the form of a duct has an opening which allows the air to fork out of the passage subject to a pressure drop.

7. The air guide box as in claim 2 wherein the air guiding element has at least two compartments, at least one of which is closed, except at the ends.

8. The air guide box as in claim 2 wherein air guiding element has a cross section that is essentially constant.

9. The air guide box as in claim 2 wherein the air guiding element is curved.

10. The air guide box as in claim 1 wherein the air guiding element further comprises a means for blocking off at least one air path or outlet path facing one another.

11. The air guide box as in claim 8 wherein at least one air path or outlet path faces each other.

12. The air guide box as in claim 2, wherein the width of the air guiding element in the direction of the axis is essentially equal to the width of an air path or outlet path.

13. The air guide box as in claim 10, wherein the width of the air guiding element in the direction of the axis corresponds essentially to between 15% and 85% of the width of a path.

* * * * *